(12) United States Patent
Kang et al.

(10) Patent No.: US 10,852,129 B2
(45) Date of Patent: Dec. 1, 2020

(54) METHOD AND DEVICE FOR MEASURING SURFACE SHAPE OF HONEYCOMB CORE

(71) Applicant: Dalian University of Technology, Liaoning (CN)

(72) Inventors: Renke Kang, Liaoning (CN); Zhigang Dong, Liaoning (CN); Xianglong Zhu, Liaoning (CN); Yan Qin, Liaoning (CN); Yidan Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 71 days.

(21) Appl. No.: 16/319,760

(22) PCT Filed: Jul. 3, 2017

(86) PCT No.: PCT/CN2017/091439
§ 371 (c)(1),
(2) Date: Jan. 22, 2019

(87) PCT Pub. No.: WO2018/014720
PCT Pub. Date: Jan. 25, 2018

(65) Prior Publication Data
US 2020/0072600 A1    Mar. 5, 2020

(30) Foreign Application Priority Data

Jul. 22, 2016 (CN) .......................... 2016 1 0585321
Jul. 22, 2016 (CN) .......................... 2016 1 0585419

(51) Int. Cl.
*G01B 11/25* (2006.01)

(52) U.S. Cl.
CPC .................. *G01B 11/2518* (2013.01)

(58) Field of Classification Search
CPC ..... G01B 11/24; G01B 11/2518; G01B 11/16; G01B 5/0009
See application file for complete search history.

(56) References Cited

U.S. PATENT DOCUMENTS

2009/0009774 A1    1/2009    Himmi et al.

FOREIGN PATENT DOCUMENTS

| CN | 101326435 A | 12/2008 |
|---|---|---|
| CN | 104330051 A | 2/2015 |
| CN | 204747780 U | 11/2015 |
| CN | 106017352 A | 10/2016 |
| CN | 106017353 A | 10/2016 |
| JP | S62174608 A | 7/1987 |

*Primary Examiner* — Tri T Ton
(74) *Attorney, Agent, or Firm* — Novick, Kim & Lee, PLLC; Allen Xue

(57) ABSTRACT

A method for measuring a surface shape of a honeycomb core includes the following steps: coating a reflective film on the surface of the honeycomb core to be measured, using a vacuum adsorption method to adhere the reflective film closely to the surface of the honeycomb core to be measured, and recessing the reflective film at a honeycomb cell downwards; and performing scanning measurement on the reflective film on the surface of the honeycomb core to be measured to obtain the heights of a honeycomb wall of the honeycomb core at different spatial positions. A device carries out the measurement of the surface shape of a honeycomb core.

13 Claims, 4 Drawing Sheets

METHOD AND DEVICE FOR MEASURING SURFACE SHAPE OF HONEYCOMB CORE

TECHNICAL FIELD

The present disclosure relates to a method and a device for measuring the surface shape of a workpiece, and more particularly, to a method for measuring a honeycomb core surface shape and a corresponding measurement device.

BACKGROUND ART

Honeycomb core is widely used in aerospace field, and is mainly used to manufacture honeycomb sandwich structure. A manufacturing process of the honeycomb sandwich structure includes: firstly, machining upper and lower surfaces of a honeycomb core member to a designed complex curved surface, and then bonding it together with a layer of pre-formed thin plate (which usually is a carbon fiber composite plate) having an opposite curved surface. A machining precision of a curved surface of the honeycomb core determines a bonding reliability between the curved surface of the honeycomb core and upper and lower thin plates, so as to further affect the performance of the whole sandwich structure. Therefore, after machining and before bonding, the machining precision of the complex curved surface of the honeycomb core shall be tested, and only qualified member can be bonded with the thin plate to form a honeycomb core composite sandwich structural member. Therefore, a reasonable measurement method is required to detect a shape precision of the complex curved surface of the honeycomb core after processing.

The machined surface of the honeycomb core has a discontinuous characteristic. The honeycomb core is a kind of porous thin-wall structure, a thickness of a honeycomb wall is 0.05 mm to 0.1 mm, a shape of the wall is mostly regular hexagon, a side length of the wall is 2 to 5 mm, and a proportion of a section of the honeycomb wall to the total surface area thereof is less than 10%, and the discontinuous characteristic causes difficulty to measure the shape precision of the complex curved surface of the honeycomb core member.

Some aerospace manufacturing enterprises use a profiling modeling method to detect the shape precision of the complex curved surface of the honeycomb core, that is to process a metal profiling modeling with the shape opposite to that of the designed curved surface of a honeycomb part, and then examine the fit degree between them, so as to judge the processing precision of the curved surface of the honeycomb core. A biggest defect of this measurement method is that a special profiling modeling shall be processed according to the detection of the honeycomb core part of each shape. However, there are many kinds of honeycomb core parts in aerospace manufacturing, which makes the number of profiling modeling huge and the manufacturing cost very high. At the same time, the precision of the complex curved surface of the honeycomb core detected by this method is limited.

In the patent with the application No. 201310485345.6 and the title "Measuring Method of Flatness of Honeycomb Cores of Combined Frame Structures", a planeness of the honeycomb core is measured by using a high-precision knife-edge ruler and a set of measuring blocks with a third or higher precision class combined with a calculation method of height difference. The patent provides a method for measuring the planeness of the honeycomb core as a whole, but a specific surface shape of the honeycomb core material cannot be obtained.

SUMMARY OF THE INVENTION

The present disclosure researches and designs a method for measuring a honeycomb core surface shape regarding to the problem put forward above. The technical means used in the present invention are as follows.

A method for measuring surface shape of honeycomb core comprises the following steps of:

1. coating a reflective film on a surface to be measured of a honeycomb core, using a vacuum adsorption method to adhere the reflective film closely to the surface to be measured of a honeycomb core, and recessing the reflective film at a honeycomb cell downwards; and 2. performing scanning measurement on the reflective film on the surface to be measured of the honeycomb core to obtain the heights of a honeycomb wall of the honeycomb core at different spatial positions.

Further, in step 1, the honeycomb core is fixed on a vacuum adsorption platform by using an air-permeable double-sided adhesive tape, and the reflective film is adsorbed on the surface of the honeycomb core by applying a negative pressure in the honeycomb core covered by the reflective film through the vacuum adsorption platform and the air-permeable double-sided adhesive tape. The vacuum adsorption platform is a porous vacuum adsorption platform, such as a porous ceramic sucker and other porous materials, or is made of natural porous materials such as cork.

Further, the air-permeable double-sided adhesive tape is a double-sided adhesive tape provided with air-permeable pores.

Further, in step 2, a laser measurement sensor is used to perform scanning measurement.

Further, the reflective film is a PE film, a PVC film or a PVDC film.

The present invention further provides a device for measuring surface shape of honeycomb core matched with the measurement method above, which comprises a laser measurement sensor, a measurement motion system, a reflective film vacuum adsorption system, a reflective film laying system, a motion control system for controlling the measurement motion system and a data processing system for processing data measured by the laser measurement sensor.

The reflective film is coated on the surface to be measured of a honeycomb core by the reflective film laying system, and vacuum adsorption is conducted to the reflective film by the reflective film vacuum adsorption system, so that the reflective film closely adheres to the surface to be measured of the honeycomb core, and the reflective film at the honeycomb cell is recessed downwards; and the laser measurement sensor installed in the measurement motion system is controlled by the motion control system to perform three-dimensional scanning to the honeycomb core, so as to obtain the heights of the honeycomb wall of the honeycomb core at different spatial positions, and then the surface shape of the honeycomb core is obtained by the data processing system.

The measurement motion system comprises a horizontal two-dimensional motion platform capable of horizontally moving relative to a machine tool workbench and a vertical motion platform fixed on the horizontal two-dimensional motion platform, and the vertical motion platform is provided with the laser measurement sensor.

The reflective film vacuum adsorption system comprises a vacuum adsorption platform installed in the machine tool workbench, the vacuum adsorption platform is provided with an air-permeable fixing plate, the air-permeable fixing plate is provided with an air-permeable double-sided adhesive tape for affixing the honeycomb core, and the vacuum adsorption platform is connected with a vacuum generation device through an air pipe.

The reflective film laying system comprises a film drawing mechanism and a film cutting mechanism; the film drawing mechanism comprises a reflective film storage box fixed on the machine tool workbench, a film-drawing rod and a transmission device for driving the film-drawing rod to move along a horizontal straight line, the film-drawing rod is provided with a clip I for drawing out the reflective film placed in the reflective film storage box, and the reflective film storage box is internally provided with rotating core shaft for winding the reflective film.

The film cutting mechanism comprises a switch for controlling the rotation of the rotating core shaft, a rotational shaft, a handle for controlling the rotation of the rotational shaft and a blade arranged on the rotational shaft.

Open the switch, the rotating core shaft can freely rotate when the reflective film is pulled.

Close the switch, the rotating core shaft is stuck and cannot rotate, the reflective film is in a tensioned state, and at the moment, the handle is operated to control the rotation of the rotational shaft to move the blade onto the reflective film, so that the reflective film can be cut off.

In working condition, the laser measurement sensor can move along a horizontal plane and a vertical direction.

The horizontal two-dimensional motion platform comprises two stanchions located on two sides of the machine tool workbench and a beam, the brace is arranged along a movement direction of the film-drawing rod, and the reflective film storage box, the rotational shaft and the transmission device are connected to the machine tool workbench through the two stanchions.

The beam is connected to upper ends of the two stanchions respectively through slide blocks, the slide blocks can slide along the movement direction of the film-drawing rod, the beam is provided with a horizontal motion platform which can slide along the movement direction perpendicular to the film-drawing rod, the horizontal motion platform is provided with the vertical motion platform, and the vertical motion platform is connected to the laser measurement sensor through a fixing plate.

The vacuum adsorption platform is a porous vacuum adsorption platform, and comprises a plurality of independent working spaces I, and a partition strip I is arranged between the adjacent independent working spaces I to be suitable for measurement requirements for different size of the honeycomb.

The air-permeable fixing plate is made of cork or porous ceramic, and has the same size as the vacuum adsorption platform, the air-permeable fixing plate comprises a plurality of independent working areas II corresponding to the independent working spaces I, and a partition strip II is arranged between the adjacent independent working areas II, so that the air paths between adjacent independent working areas II cannot be communicated, and a space for containing the vacuum adsorption platform and the air-permeable fixing plate is arranged in the machine tool workbench, the spaces limit the horizontal movement of the vacuum adsorption platform and the air-permeable fixing plate, and that is, the vacuum adsorption platform and the air-permeable fixing plate can only be taken out and replaced along a vertical direction.

The air-permeable fixing plate is made of cork or porous ceramic, which uses the air-permeable characteristic thereof, and in the condition that the vacuum of the honeycomb core is not affected, the vacuum suction of the vacuum adsorption platform is more uniform, which is matched with the air-permeable double-sided adhesive tape to fix the honeycomb core.

The size of the air-permeable double-sided adhesive tape is the same as the size of the fixed end of the honeycomb core, so as to prevent an excessive part from sticking to the reflective film and affecting the adsorption of the reflective film by the vacuum adsorption platform.

The air-permeable double-sided adhesive tape is a double-sided adhesive tape with micropores, and the air permeability thereof does not affect the adsorption effect of the vacuum adsorption platform to the reflective film during measurement.

The vacuum generating device is a vacuum generator or a vacuum pump, and the vacuum generating device is also provided with a vacuum-degree control mechanism.

The transmission device is a pulley gear or a chain gear.

The pulley gear comprises two belts, and a driving pulley and a driven pulley matched with the belts; the driving pulley is provided with a pulley motor, and two ends of the film-drawing rod are fixedly connected to the two belts respectively.

The chain gear comprises two chains, and a driving chain wheel and a driven chain wheel matched with the chains, the driving chain wheel is provided with a chain wheel motor, and two ends of the film-drawing rod are fixedly connected to the two chains respectively.

The clip I pulls the reflective film out of the reflective film storage box through the clip II arranged on the free end of the reflective film, and the clip II is used for increasing an area of the reflective film clamped by the clip I, so as to reduce operation difficulty that the reflective film is not easy to be flattened when the clip I directly clamping it.

The material of the joint between the clip II and the reflective film is soft material, such as rubber, so as to reduce a stress on the reflective film during pulling, and a position of the clip I on the film-drawing rod can be manually adjusted, and the clip II is detachably connected to the reflective film.

The blade is a sawtooth blade.

The reflective film has a good reflectivity to laser light, and can be recessed downwards at the honeycomb cell, with a rigidity meeting the requirement under the vacuum adsorption effect and not easy to damage. The reflective film is still suitable for measuring curved surface with large curvature, and even a small wrinkle can be removed through post-data processing.

The reflective film is a PE film, a PVC film or a PVDC film.

Compared with the prior art, the present invention has the following beneficial effects.

1. High measurement precision. According to the present disclosure, the high-precision laser measurement sensor can be selected, and the precision is high compared with the current method for detecting the precision of the surface shape of the honeycomb in a profiling modeling method.

2. Low usage costs. At present, some aerospace companies use the profiling modeling method, the special profiling modeling for the detection of the honeycomb core part of each shape needs to be processed and manufactured, and however, the honeycomb core part in aerospace manufacturing has many types, thus resulting in a huge number of profiling modelings and high manufacturing costs. The present disclosure can satisfy the measurement to different types of honeycomb cores and reduce the using costs.

3. High measurement efficiency. The present disclosure is convenient to operate, and the honeycomb core is scanned by the laser measurement sensor after film laying and film suction operation, and through a data processing system to obtain the surface shape of the honeycomb core with high measurement efficiency.

4. Good applicability. According to the present disclosure, the measurement to the honeycomb core is not limited by the surface shape of the honeycomb core, and can adapt to the measurement for the plane, inclined plane, curved surface and the like of the honeycomb core.

5. Rich in acquired information. According to the present disclosure, not only the three-dimensional height surface shape information of the honeycomb core can be obtained, but also the cell information of the honeycomb core can be obtained, and the cell deformation of the honeycomb core can be analyzed.

6. Capability of realizing in-situ measurement. The method of the present disclosure can be applied to the processing equipment of the honeycomb core to directly measure the surface shape of the honeycomb core after processing.

DETAILED DESCRIPTION OF THE PREFERRED EMBODIMENTS

Embodiment 1

Figure 1:
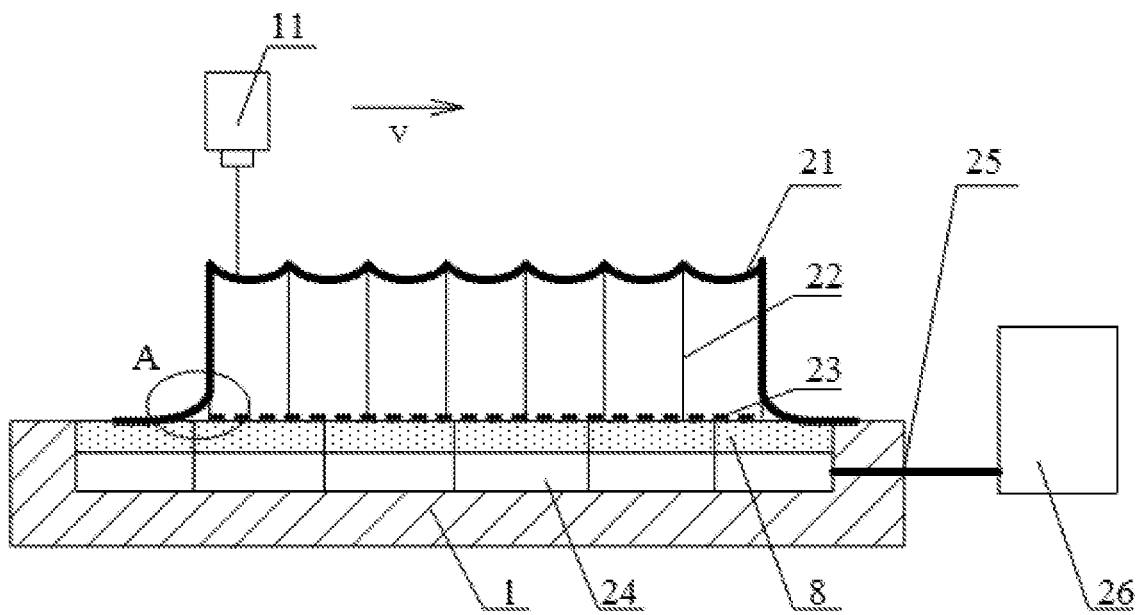
FIG. 1 is a diagram illustrating the measurement state of a surface shape of the honeycomb core according to the embodiments of the present disclosure.
Figure 2:
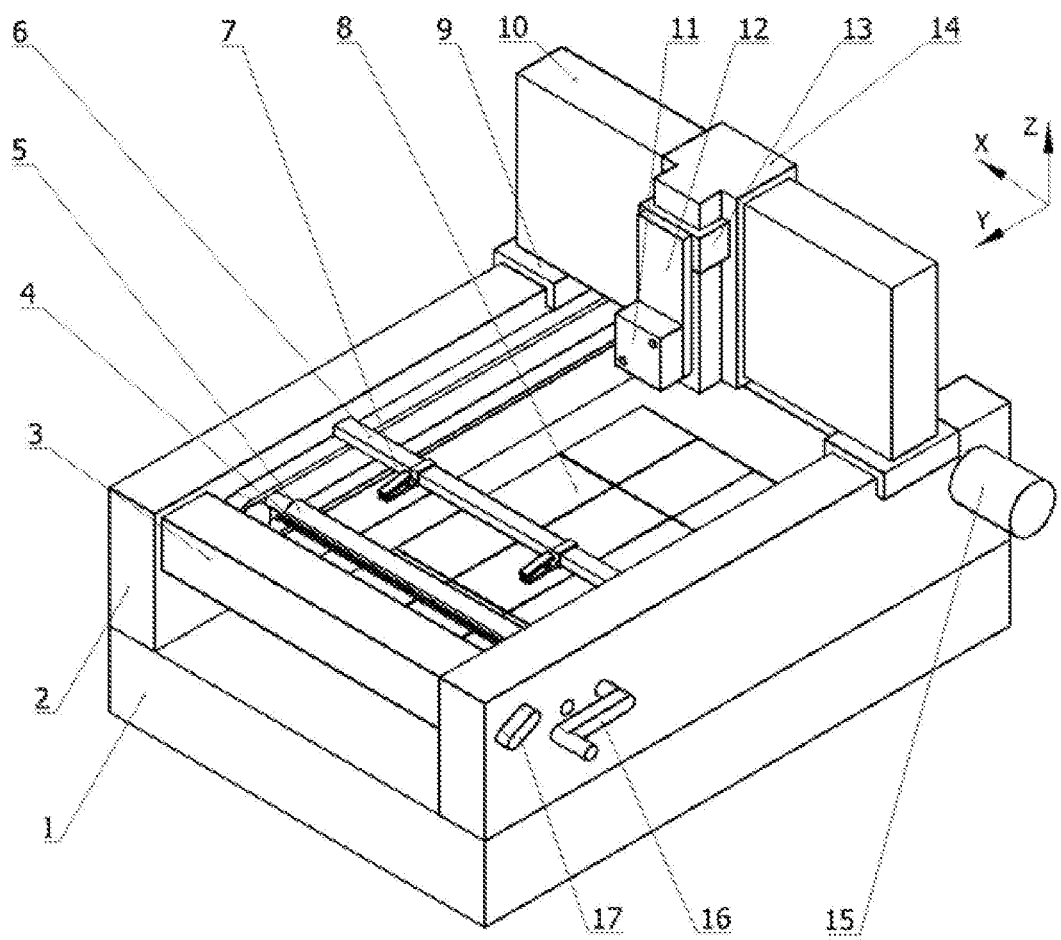
FIG. 2 is a spatial structure diagram illustrating the device for measuring a honeycomb core surface shape in the first embodiment of the present disclosure.

As shown in FIG. 1, a method for measuring surface shape of a honeycomb core comprises the following steps:
1. A reflective film 21 is coated on the surface to be measured of a honeycomb core 22, a vacuum adsorption method is used to closely adhere the reflective film 21 to the surface to be measured of a honeycomb core 22, and the reflective film 21 at a honeycomb cell is recessed downwards. Therefore, the measured data may peak at a honeycomb wall, and the measured value minus a thickness of the reflective film 21 is a height of the honeycomb wall.
2. Scanning measurement is performed to the reflective film 21 on the surface to be measured of the honeycomb core 22 to obtain honeycomb wall heights of the honeycomb core at different spatial positions.

In step 1, the honeycomb core 22 is fixed on a cork 8 by using an air-permeable double-sided adhesive tape 23, the adsorption is performed penetrating the cork 8 and the air-permeable double-sided adhesive tape 23 by a vacuum adsorption device 24 using air permeability of the cork 8, the air-permeable double-sided adhesive tape 23 is a double-sided adhesive tape provided with air-permeable micropores, which ensures that the honeycomb core 22 can be fixed by the double-sided adhesive tape during processing, and the air permeability thereof does not affect the adsorption of the vacuum adsorption device 24 to the film 21 during measurement, so as to realize in-situ measurement. During the measurement, the honeycomb core 22 is bonded to the cork 8 through the air-permeable double-sided adhesive tape 23, then the cork 8 is fixed on the vacuum adsorption device 24, the selected film 21 is laid on the surface of the honeycomb core 22, and the film 21 is closely adhered to the surface of the honeycomb core 22 by the vacuum adsorption effect.

In step 2, a laser measurement sensor 11 is used to scan the honeycomb material according to a specified route; according to the movement trail of the laser measurement sensor 11 and in the combination of the measurement result of the sensor, the heights of the honeycomb wall of the honeycomb material at different spatial positions can be obtained through post-data processing, so that surface shape measurement can be performed to the plane, inclined plane and curved surface of the honeycomb core, and in order to obtain the best measurement effect, incident laser light shall be directed along a height direction of the honeycomb wall of the honeycomb core 22.

The film 21 shall have a good reflectivity for laser light, and can be recessed downwards at the honeycomb cell with a rigidity meeting the requirement under the vacuum adsorption effect, and not easy to damage in use. The reflective film 21 is PE film, PVC film or PVDC film.

The vacuum adsorption device 24 and the cork 8 are arranged in a machine tool workbench 1, and the vacuum adsorption device 24 is connected with a vacuum generating device 26 through an air pipe 25.

Embodiment 2

As shown in FIGS. 1 to 5, a device for measuring a surface shape of a honeycomb core comprises a laser measurement sensor 11, a measurement motion system, a reflective film vacuum adsorption system, a reflective film laying system, a motion control system for controlling the measurement motion system and a data processing system for processing data measured by the laser measurement sensor.

The measurement motion system comprises a horizontal two-dimensional motion platform capable of horizontally moving relative to a machine tool workbench and a vertical motion platform 13 fixed on the horizontal two-dimensional motion platform, and the vertical motion platform 13 is provided with the laser measurement sensor 11.

The reflective film vacuum adsorption system comprises a vacuum adsorption platform 24 installed in the machine tool workbench 1; the vacuum adsorption platform 24 is provided with an air-permeable fixing plate 8, the air-permeable fixing plate 8 is provided with an air-permeable double-sided adhesive tape 23 for affixing the honeycomb core 22, and the vacuum adsorption platform 24 is connected with a vacuum generating device 26 through an air pipe 25.

The reflective film laying system comprises a film drawing mechanism and a film cutting mechanism; the film drawing mechanism comprises a reflective film storage box 3 fixed on the machine tool workbench 1, a film-drawing rod 6 and a transmission device for driving the film-drawing rod 6 to move along a horizontal straight line, the film-drawing rod 6 is provided with a clip I 7 for drawing out the reflective film 21 placed in the reflective film storage box 3, and the reflective film storage box 3 is internally provided with a rotating core shaft for winding the reflective film 21.

The film cutting mechanism comprises a switch 17 for controlling the rotation of the rotating core shaft, a rotational shaft 5, a handle 16 for controlling the rotation of the rotational shaft 5 and a blade 4 arranged on the rotational shaft 5.

The horizontal two-dimensional motion platform comprises two stanchions 2 located on two sides of the machine tool workbench 1 and a beam 10, the brace 2 is arranged along a movement direction of the film-drawing rod 6, and the reflective film storage box 3, the rotational shaft 5 and the transmission device are connected to the machine tool workbench 1 through the two stanchions 2.

The beam 10 is connected to upper ends of the two stanchions 2 respectively through slide blocks 9, the slide block 9 can slide along the movement direction of the film-drawing rod 6, the beam 10 is provided with a horizontal motion platform 14 which can slide along the movement direction perpendicular to the film-drawing rod 6, the horizontal motion platform 14 is provided with the vertical translation platform 13, and the vertical motion platform 13 is connected to the laser measurement sensor 11 through a fixing plate 12.

In working condition, the laser measurement sensor 11 can move along a horizontal plane and a vertical direction. That is, the vertical motion platform 13 can slide on the horizontal motion platform 14 to realize the movement of the laser measurement sensor 11 along a Z-axis direction. The horizontal motion platform 14 sliding on the beam 10 to realize the movement of the laser measurement sensor 11 along an X-axis direction, and the slide blocks 9 on two sides sliding on the two stanchions 2 to realize the movement of the laser measurement sensor 11 along a Y-axis direction.

The vacuum adsorption platform 24 is a porous vacuum adsorption platform, and comprises a plurality of independent working spaces I, and a partition strip I is arranged between the adjacent independent working spaces I.

The air-permeable fixing plate 8 is made of cork, and has the same size as the vacuum adsorption platform 24, the air-permeable fixing plate 8 comprises a plurality of independent working areas II corresponding to the independent working spaces I, a partition strip II is arranged between the adjacent independent working areas II, and a space for containing the vacuum adsorption platform 24 and the air-permeable fixing plate 8 is arranged in the machine tool workbench 1.

Figure 3:
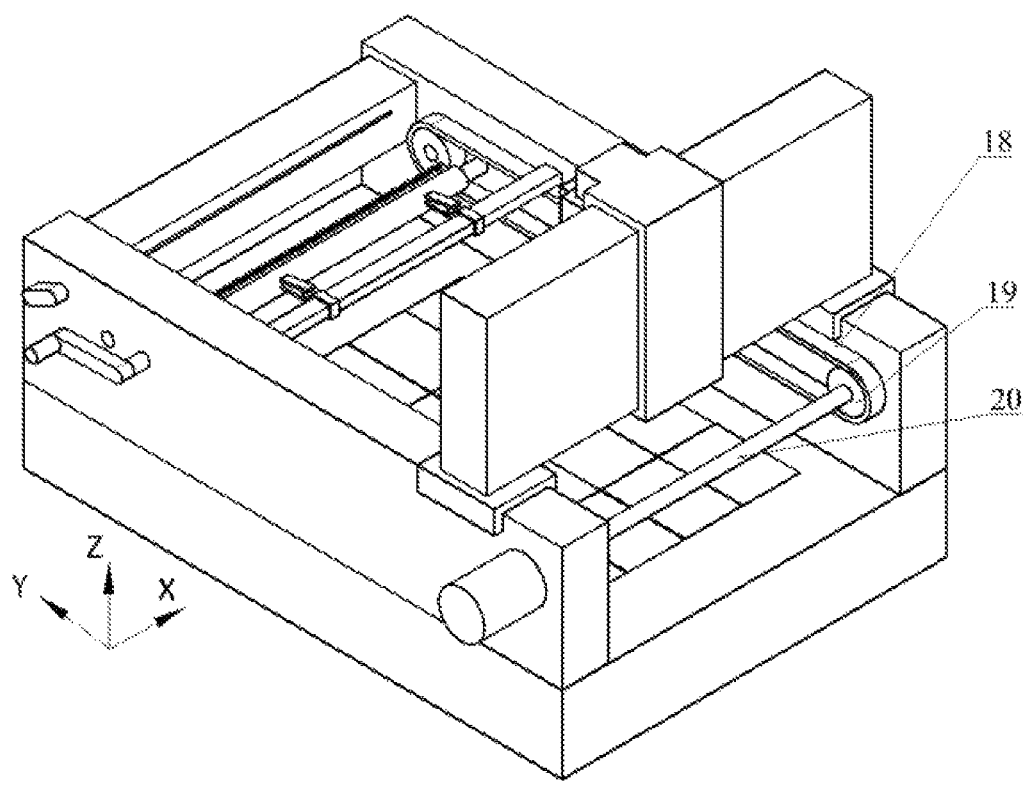
FIG. 3 is a spatial structure diagram illustrating the device for measuring a honeycomb core surface shape in the first embodiment of the present disclosure from another perspective.
Figure 4:
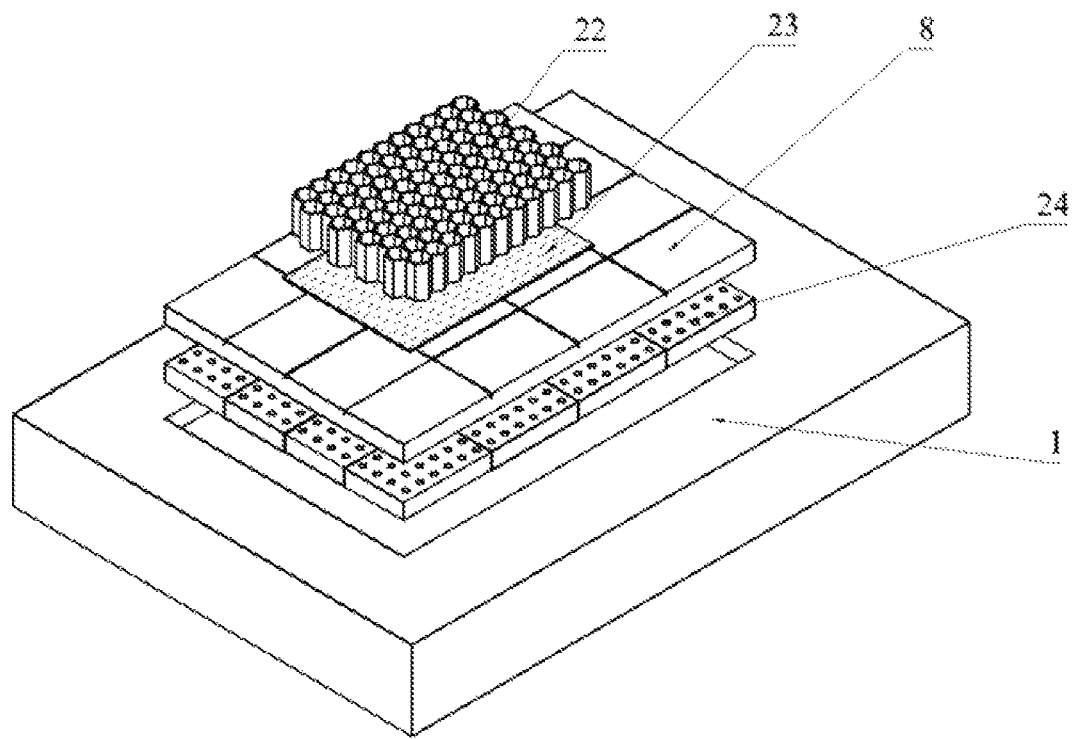
FIG. 4 is a structure diagram illustrating the reflective film vacuum adsorption system in the first embodiment of the present disclosure.
Figure 5:
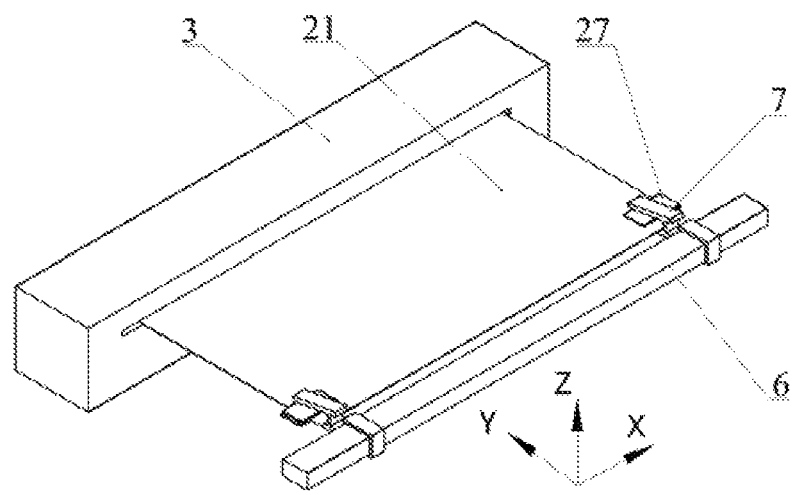
FIG. 5 is a diagram illustrating the reflective film pulled out in the first embodiment of the present disclosure.

When coating the film, the reflective film 21 shall cover the independent working area II where the honeycomb core 22 is located, and a specific form may refers to part A shown in FIG. 3.

The size of the air-permeable double-sided adhesive tape 23 is the same as the size of the fixed end of the honeycomb core 22, and the air-permeable double-sided adhesive tape 23 is a double-sided adhesive tape with micropores.

The vacuum generating device 26 is a vacuum generator or a vacuum pump, and the vacuum generating device 26 is also provided with a vacuum-degree control mechanism.

The transmission device is a pulley gear.

The pulley gear comprises two belts 18, and a driving pulley 19 and a driven pulley matched with the belts 18, the driving pulley 19 is connected to a pulley motor 15 through a driving shaft I 20, and two ends of the film-drawing rod 6 are fixedly connected to the two belts 18 respectively.

The pulley motor 15 rotates forwardly and reversely so that the driving shaft I 20 drives the belt 18 to move, thus driving the film-drawing rod 6 to move; according to a movement range of the film-drawing rod 6, a rotational range of the pulley motor 15 can be set.

The clip I 7 pulls the reflective film 21 out of the reflective film storage box 3 through a clip II 27 arranged on a free end of the reflective film 21, and the material of the joint between the clip II 27 and the reflective film 21 is rubber.

The blade 4 is a sawtooth blade.

The reflective film 21 is PE film.

Embodiment 3

A device for measuring a surface shape of a honeycomb core is provided, which is distinguished from the device for measuring a surface shape of a honeycomb core in the embodiment 1 in that: the transmission device is a chain gear.

The chain gear comprises two chains, and a driving chain wheel and a driven chain wheel matched with the chains, wherein the driving chain wheel is connected to a chain wheel motor through a driving shaft II, and two ends of the film-drawing rod 6 are fixedly connected to the two chains respectively.

The chain wheel motor rotates forwardly and reversely so that the driving shaft II drives the chain to move, thus driving the film-drawing rod 6 to move, and according to a movement range of the film-drawing rod 6, a rotational range of the chain wheel motor can be set.

The reflective film 21 is PVC film.

The air-permeable fixing plate 8 is made of porous ceramic.

The forgoing is only preferred detailed embodiments of the present disclosure, but does not limit the protection scope of the present disclosure. The equal replacement or amendment made by any skilled person in the art in the technical scope disclosed by the present disclosure according to the technical solutions and the inventive concept of the present invention shall fall with the protection scope of the present invention.

The invention claimed is:

1. A method for measuring surface shape of honeycomb core, comprising:
   step 1: applying a reflective film on a surface of a honeycomb core using a vacuum adsorption method to adhere the reflective film to the surface of the honeycomb core, and recessing the reflective film at a honeycomb cell downwards; and
   step 2: performing scanning measurement on the reflective film adhered to the surface of the honeycomb core to obtain a height of a honeycomb wall of the honeycomb core at a plurality of spatial positions.

2. The method for measuring surface shape of honeycomb core according to claim 1, wherein, in step 1, the honeycomb core is affixed to a vacuum adsorption platform using an air-permeable double-sided adhesive tape, and the reflective film is adhered to the surface of the honeycomb core by applying a vacuum to the honeycomb core covered by the reflective film through the vacuum adsorption platform and the air-permeable double-sided adhesive tape.

3. The method for measuring surface shape of honeycomb core according to claim 1, wherein in step 2, a laser measurement sensor is used to perform scanning measurement.

4. A device for measuring surface shape of honeycomb core, comprising:
- a reflective film laying system for laying a reflective film on an open surface of a honeycomb core;
- a reflective film vacuum adsorption system for adhering the reflective film on the open surface of the honeycomb core by applying a vacuum;
- a measurement motion system configured to move a laser measurement sensor horizontally and vertically so that the laser measurement sensor scans the reflective film adhered on the open surface of the honeycomb core; and
- a data processing system for processing data measured by the laser measurement sensor,
  - wherein the measurement motion system comprises a machine tool workbench, a horizontal two-dimensional motion platform mounted on the machine tool workbench and configured to horizontally move relative to a machine tool workbench and a vertical motion platform affixed to the horizontal two-dimensional motion platform, and the laser measurement sensor is affixed to the vertical motion platform and configured to move horizontally with the vertical motion platform about the horizontal two-dimensional motion platform and to move vertically about the vertical motion platform,
  - wherein the reflective film vacuum adsorption system comprises a vacuum adsorption platform affixed to the machine tool workbench, wherein the vacuum adsorption platform comprises an air-permeable fixing plate, the air-permeable fixing plate is provided with an air-permeable double-sided adhesive tape for affixing a honeycomb core, and the vacuum adsorption platform is connected with a vacuum generating device through an air duct,
  - wherein the reflective film laying system comprises a film drawing mechanism and a film cutting mechanism,
  - wherein the film drawing mechanism comprises a reflective film storage box affixed to the machine tool workbench, a film-drawing rod, and a transmission device for driving the film-drawing rod to move along a horizontal direction, the film-drawing rod is provided with a first clip for drawing out a reflective film placed in the reflective film storage box, and the reflective film storage box is internally provided with a rotating core shaft for winding the reflective film,
  - wherein the film cutting mechanism comprises a switch for controlling rotation of the rotating core shaft, a rotational shaft, a handle for controlling the rotation of the rotational shaft, and a blade arranged on the rotational shaft, and
  - wherein the film cutting mechanism are affixed to the machine tool workbench.

5. The device for measuring surface shape of honeycomb core according to claim 4, wherein the horizontal two-dimensional motion platform comprises two stanchions located on two sides of the machine tool workbench and a beam, a brace arranged along a movement direction of the film-drawing rod, and the reflective film storage box, the rotational shaft and the transmission device are connected to the machine tool workbench through the two stanchions; and
- the beam is connected to upper ends of the two stanchions respectively through slide blocks, the slide blocks is configured to slide along the movement direction of the film-drawing rod, the beam is connected to the horizontal motion platform configured to move perpendicular to the film-drawing rod, the horizontal motion platform is connected to the vertical motion platform, and the vertical motion platform is connected to the laser measurement sensor through a fixing plate.

6. The device for measuring surface shape of honeycomb core according to claim 4, wherein the vacuum adsorption platform comprises a plurality of independent working spaces, and a partition strip arranged between two of the plurality of working spaces; and
- the air-permeable fixing plate is made of cork or porous ceramic, the air-permeable fixing plate comprises a plurality of independent working areas corresponding to the plurality of independent working spaces, and a partition strip arranged between the two of the plurality of independent working areas.

7. The device for measuring surface shape of honeycomb core according to claim 4, wherein the air-permeable fixing plate and the vacuum adsorption platform has a same size, and a size of the air-permeable double-sided adhesive tape is of a same as a size of a fixed end of the honeycomb core.

8. The device for measuring surface shape of honeycomb core according to claim 4, wherein the vacuum generating device is a vacuum pump.

9. The device for measuring surface shape of honeycomb core according to claim 4, wherein the transmission device is a pulley gear or a chain gear.

10. The device for measuring surface shape of honeycomb core according to claim 4, wherein the first clip pulls the reflective film out from the reflective film storage box through a second clip arranged on a free end of the reflective film, and a joint between the second clip and the reflective film is made of a soft material.

11. The device for measuring surface shape of honeycomb core according to claim 4, wherein the blade is a sawtooth blade.

12. The device for measuring surface shape of honeycomb core according to claim 4, wherein the reflective film is configured to reflect laser light.

13. The device for measuring surface shape of honeycomb core according to claim 12, wherein the reflective film is a PE film, a PVC film, or a PVDC film.

* * * * *